Patented Apr. 14, 1942

2,280,034

UNITED STATES PATENT OFFICE 2,280,034

PROCESS FOR MAKING IMPROVED OIL WELL WEIGHTING MATERIALS

Leslie Roth Harrison, Jr., Malvern, Ark., assignor to Magnet Cove Barium Corporation, Malvern, Ark., a corporation of Arkansas No Drawing. Application March 28, 1941, Serial No. 385,758

14 Claims. (Cl. 252—8.5)

My invention relates to improvements in process for making improved oil well weighting materials.

My invention relates to the production of oil well weighting materials for use as oil well drilling "muds." In the past, ground materials such as barite have been commonly used as oil well weighting materials, but this material per se has not always proven itself to be entirely satisfactory. For example: Many products have such high viscosity that a very heavy mixture can not be made without the fluid becoming sticky and thereby gumming up the machinery.

An object of my invention is to produce an improved oil well weighting material by the use of ground barite to which small quantities of wetting agents have been added, together with unsaponifiable oils, acids, alkalies or salts, and subsequently calcined in order to remove the air avid effect of the wetting agents.

A further object is to provide a weighting material which may be satisfactorily used as an oil well drilling "mud," and which will not appreciably lower the apparent weight in the well by virtue of the fact that the material is devoid of the air avid effect usually present in ground barite or similar substances.

A further object is to provide a weighting material, the viscosity characteristics of which are materially lowered.

To produce my improved weighting material I have found that by combining and mixing ground natural barite in wet pulp with small quantities of organic wetting agents, thoroughly coating the ground particles of barite, and then by subsequently calcining the resultant mixture, that the wetting agent may be removed from the mix, and thereby leave the ground mineral in a condition to be more satisfactorily used as an oil well weighting material.

In preparing my improved oil well weighting material, I use ground natural barite ore and add thereto suitable organic wetting agents either alone or in combination with unsaponifiable hydrocarbon oils, and/or inorganic acids, alkalies or salts, such wetting agents, for example as saturated fatty acids, unsaturated fatty acids, saturated fatty acid soaps, unsaturated fatty acid soaps, sulphonated fatty acids, sulphated fatty acids, others of the wetting type of chemicals, too numerous to mention. By what I have called unsaponifiable hydrocarbon oils I have in mind gas oil, kerosene, fuel oil, etc.

The amount of wetting agents to be used may be varied considerably, and I have found that the quantity to be used per ton of ground barite may vary as much as from .05 to 5. pounds. The amount of unsaponifiable oil used in the process may vary from .0 to 25. pounds per ton, and likewise the amount of inorganic acids, alkalies, or salts used may vary from .0 to 25. pounds per ton. All quantities are based on pounds of reagents per 2,000 pounds (one ton) of ground weighting material. The percent of solids of the wet pulp used in mixing the weighting materials with the reagents varies from 1 to 80, and I have found from experimentation that from 15% to 30% of solids in mixing is the most desirable proportion.

In many cases it may be desirable to agitate the mass of weighting material and wetting agent at a low percent solids in water, subsequently thickening it in a metallurgical thickener tank, and then filter it in any of various types of filters. By following this procedure of thickening and filtering the slurry, the efficiency of calcination may be greatly increased.

After having made a thorough mixture of the ground barite or weighting material with the wetting or detergent agents, I then calcine the mixture in suitable apparatus under suitably controlled heat regulation. It may be found satisfactory to heat the calcining mixture only sufficiently to vaporize the wetting materials, or it may be desired to increase the heat to the necessary extent to burn or completely oxydize the wetting agents. In some instances, I have found that a desirable temperature during the calcining process is approximately 900° F. Other satisfactory temperatures for the calcining or heat treatment of the mixture may vary considerably to as high as the order of 900° C. Lower temperatures may start volatilization, but by the use of a temperature of the higher order the wetting agents and inorganic chemicals may be properly and more rapidly removed and thereby produce the desired weighting material.

To clarify the situation and to define some of the terms which have been used in the above specification, I have used the term wetting agents as they are commonly called and widely used in the textile industry, namely organic chemical reagents that have a property of wetting textile materials in a suitable manner to prepare the material so that it may be much more easily dyed. Common wetting agents are soaps, fatty acids, and sulphonates. In referring to unsaponifiable oils, I refer particularly to oils such as gas-oil, kerosene, fuel oils, etc. The term air avid means that a mineral is imparted surface properties which tend to make it attach to air bubbles rather than be filmed with liquid. The barite referred to herein is intended to mean natural or mineral barite which has not been subjected to any special bleaching or similar purification unrelated to its use as a drill weighting material.

I claim:

1. The method of conditioning barite as a weighting material comprising mixing the same in a watery pulp with a wetting agent, thickening and filtering the mixture, and calcining the residue.

2. The method of treating ground barite to improve the same as a drilling fluid weighting material comprising mixing the same with a wetting agent and calcining to a degree sufficient to remove the wetting agent.

3. A water avid barite conditioned for use as a drilling fluid weighting material by mixing normal barite with a wetting agent and calcining to a degree sufficient to remove the wetting agent and destroy air avidity.

4. The method of conditioning barite as a weighting material comprising mixing the same with a mixture of a wetting agent and an inorganic substance selected from the group consisting of inorganic acids, alkalies, and salts, and calcining at a temperature up to about 900° C.

5. The method of conditioning barite as a weighting material comprising mixing the same with a mixture of a wetting agent, an unsaponifiable oil, and an inorganic substance selected from the group consisting of inorganic acids, alkalies, and salts, and calcining.

6. A weighting material for drilling "muds" comprising water-avid barite formed by mixing natural barite with a wetting agent, an inorganic substance and an unsaponifiable oil, the inorganic substance being selected from the group of inorganic acids, alkalies and salts, and calcining to remove the wetting agent.

7. The method of conditioning barite as a weighting material comprising mixing the same with a wetting agent selected from the group consisting of higher saturated and unsaturated fatty acids, sulphonated higher fatty acids, sulphated higher fatty acids, and soaps thereof, and calcining the same to remove the wetting agent.

8. A method of conditioning barite as a weighting material comprising mixing the same with higher fatty acids, and calcining.

9. A method of conditioning barite as a weighting material comprising mixing the same with a higher fatty acid, the fatty acid being a sulphated fatty acid, and calcining.

10. A method of conditioning barite as a weighting material comprising mixing the same with a wetting agent, the wetting agent being a higher fatty acid soap selected from the group consisting of saturated fatty acid soaps, unsaturated fatty acid soaps, sulphonated fatty acid soaps, and sulphated fatty acid soaps, and calcining.

11. A method of conditioning barite as a weighting material comprising mixing the same with a higher fatty acid, the fatty acid being an amino sulphated fatty acid, and calcining.

12. A method of conditioning barite as a weighting material comprising mixing the same with a higher fatty acid soap, and calcining.

13. A method of conditioning barite as a weighting material comprising mixing the same with a sulphonated higher fatty acid soap, and calcining.

14. A method of conditioning barite as a weighting material comprising mixing the same with a sulphated higher fatty acid soap, and calcining.

LESLIE ROTH HARRISON, Jr.